(12) United States Patent
Akiyama et al.

(10) Patent No.: US 7,380,313 B2
(45) Date of Patent: Jun. 3, 2008

(54) HINGE DEVICE AND ELECTRONIC EQUIPMENT USING THE SAME

(75) Inventors: Hirofumi Akiyama, Kanagawa (JP); Tsutomu Satoh, Osaka (JP)

(73) Assignees: Katoh Electrical Machinery Co., Ltd, Kanagawa (JP); Sharp Kabushiki Kaisha, Osaka (JP)

( * ) Notice: Subject to any disclaimer, the term of this patent is extended or adjusted under 35 U.S.C. 154(b) by 319 days.

(21) Appl. No.: 11/132,951

(22) Filed: May 18, 2005

(65) Prior Publication Data

US 2005/0268429 A1    Dec. 8, 2005

(30) Foreign Application Priority Data

May 24, 2004   (JP)   .............................. 2004-153899

(51) Int. Cl.
  *E05D 3/10*   (2006.01)
(52) U.S. Cl. ............................ 16/367; 16/326; 16/374; 16/340
(58) Field of Classification Search ................. 16/367, 16/366, 374, 340, 342, 326, 327, 337; 361/680–683; 248/917, 919–922, 125.1, 125.8, 278.1; 455/575.1, 455/575.4, 575.8, 550.1, 90.3; 348/373, 348/333.06
See application file for complete search history.

(56) References Cited

U.S. PATENT DOCUMENTS 6,742,221 B2 * 6/2004 Lu et al. ........................ 16/367

6,850,407 B2 * 2/2005 Tanimoto et al. ........... 361/681
6,912,122 B2 * 6/2005 Chen et al. .................. 361/681

FOREIGN PATENT DOCUMENTS

| JP | 10-340134 | 6/1997 |
| JP | 10-340134 | 12/1998 |
| JP | 2001-227229 | 2/2000 |
| JP | 2001-227229 | 8/2001 |

* cited by examiner

*Primary Examiner*—Chuck Y. Mah
(74) *Attorney, Agent, or Firm*—Notaro & Michalos P.C.

(57) ABSTRACT

In order to provide a hinge device exhibiting a latchless function even if a lock mechanism exposed on respective surfaces of a main body and a lid body is abolished and a small-sized electronic equipment using the same, the present invention is a hinge device coupling the main body and the lid body in a turnable manner in an open/close direction and a direction perpendicular to it, in which the hinge device includes a mounting member and supporting member to be mounted to either the main body or the lid body; a horizontal shaft member mounted to the mounting member and having a locking groove at an outer periphery thereof; an orthogonal shaft member mounted to the supporting member and having an engaging groove at an outer periphery thereof, the orthogonal shaft groove being orthogonal to the horizontal shaft member; a bracket member mounted to the horizontal shaft member and the orthogonal shaft member to allow the main body and the lid body to turn in the open/close direction and the direction perpendicular to it; and a restriction mechanism having a restriction pin being engaged with either the locking groove or the engaging groove.

10 Claims, 21 Drawing Sheets

HINGE DEVICE AND ELECTRONIC EQUIPMENT USING THE SAME

BACKGROUND OF THE INVENTION

1. Field of the Invention

The present invention relates to a hinge device composing a lid body in an openable/closable manner with respect to a main body and further composing the lid body in a turnable manner in the direction orthogonal to the opening/closing direction, and a small-sized electronic equipment such as a notebook personal computer, a laptop personal computer, a camera, a camcorder, or a cellular phone that uses the hinge device.

2. Description of the Related Art

Among the above-mentioned various electronic equipment, there is conventionally known in Japanese Patent Application Laid-Open No. Hei10-340134 (Patent document 1) an electronic equipment of a compatible structure in which a display unit such as a liquid crystal display device, a plasma display device, a lid body, or the like (hereinafter simply referred to as a "lid body") is mounted in an openable/closable manner to a main body having an in-built key board section and control unit, and the lid body is further structured in a turnable manner in the direction orthogonal to the opening/closing direction when the lid body is opened at a prescribed angle with respect to the main body, by coupling between the main body and the lid body with a hinge device composed of two shafts being orthogonal to each other.

However, among others, these electronic equipment have a problem, in that a lock means for locking the lid body in a closed state with respect to the main body is exposed on an outer surface, so that the lock means contacts with the surface of a housing of the main body (the surface in which the key board section is mounted in the case of the notebook personal computer) when the lid body is opened, and at the same time, the housing of the main body and the lock means tend to be damaged.

As a solution to the above-described problem, it is possible to conceive one obtainable by devising the structure or the arrangement of the lock means, or so forth, however, there is another problem of reducing space for mounting the lock means on the back of the demand for downsizing and weight saving in the overall equipment even in a small-sized electronic equipment based on a potable use such as the notebook personal computer or the like, as well as, as a matter of course, in extremely small-sized electronic equipment such as a cellular phone. Therefore, as in the case of the general cellular phone of a twofold type, even in the other electronic equipment, there is an effort to try to realize a latchless mechanism that enables a locked state without exposing or protruding the lock means on the surface of the main body or the lid body.

The latchless mechanism mentioned here means a structure in which, when the lid body is turned in a closing direction with respect to the main body at a reference angle or below, the closing state is further accelerated in the turning direction, and the most primitive structure thereof is that comes to the closing state by the weight of the lid body itself with the use of the hinge device of a cam/distortion hinge structure. In recent years, however, that provided with a biasing member such as a spring or that has a devised locking structure is common for the reason of letting a user have a click feeling (letting the user feel that it is closed determinably), or so forth.

Notwithstanding the above, in the case of the above-mentioned electronic equipment of the compatible structure, the closing operation of the lid body and the main body may be performed in an irregular state (in the state in which the lid body is swung left or right), so that to incorporate the latchless mechanism into the compatible structure raises a new problem that the lid body and the main body possibly clashes strongly in the irregular state, in other words, the equipment is of a structure easily damaged by the clash of the display/main body more than ever (than those having no latchless mechanism).

As a solution to this problem, in the previously-mentioned Patent document 1, the lid body is structured to be lifted upward to realize a turn in the horizontal direction by artfully devising the structure, arrangement, locking relation, and so on between the lid body and the main body.

Further, as the other solutions to the problem, those in which the turn in the open/close direction (for opening/closing the lid) is restricted depending on the turn state in the horizontal direction (swing state), in which, contrary thereto, the turn in the horizontal direction (swing) is restricted depending on the rotation state (the open/close state of the lid) in the open/close direction, in which, further, above-described both the restrictions are adopted to solve the problem (solution by limiting the turn), or so forth are conceivable. As a specific mechanism structure of the above one adopting both the restrictions, for example, that in Japanese Patent Application Laid-Open No.2001-227229 (Patent document 2) is known.

In the above-described Patent document 1, there is no disclosure about the means for restricting the rotation of the lid body in the open/close direction until the lid body is opened at a prescribed angle with respect to the main body; the means for restricting the vertical turn of the lid body when the lid body is in the state of being turned horizontally; nor the previously-described latchless mechanism, so that there were cases where the lid body is turned while it is not opened sufficiently and where the lid body is closed while it is not horizontally turned at an angle of 180 degrees, leaving problems that the lid body and the main body are easily damaged thereby, and they are easily damaged also by the lock mechanism.

That disclosed in the above-described Patent document 2 is structured such that a hinge device to be provided between a lid body and a main body is composed of a first shaft member provided to a mounting member provided in the main body and a second shaft member provided in a supporting member provided in the lid body in which the first and second shaft members are provided in a turnable manner with respect to a bracket, and in which a means for restricting a turn of the bracket composed of: a recession formed at the outer periphery of the first shaft member to accommodate a tip of the second shaft member to allow the second shaft member to turn freely, a protrusion formed at the tip of the second shaft member, and an outer peripheral groove formed at the outer periphery of the first shaft member continuously to/from the recession to accommodate the protrusion to allow the second shaft member to turn freely around the first shaft member while restricted to turn around the axis thereof. Note that, for the hinge device in Patent document 2, no description is given as to the latchless mechanism, however, when incorporating the latchless mechanism into this hinge device of Patent document 2, it is considered to be the most common that the mechanism is provided on the first shaft member which restricts the second shaft member and vice versa (mutually affecting to/from the protrusion formed at the tip portion of the second shaft member and the like).

Such a hinge device has a mechanism in which the respective parts are gathered at one place, so that a quality defective leads to replacement or decomposition of the entire hinge device, causing higher production and quality costs problem. The small-sized electronic equipment is restricted in a thickness direction in an effort to reduce the thickness, however, they are not restricted so much in the lateral direction, so that it should be taken into account that the hinge device is not required to be gathered at one place therein.

SUMMARY OF THE INVENTION

It is an object of the present invention to provide a hinge device structured to be able to lower production and quality costs even if various types of functions are added thereto, and also capable of exhibiting a latchless function even if a lock mechanism exposed on the respective surfaces of a main body and a lid body is abolished, and a small-sized electronic equipment using the same.

In order to attain the above-described object, the present invention is a hinge device connected with an open/close hinge for opening and closing a main body and a lid body in the open/close direction and a turning hinge for turning said main body and said lid body in the direction orthogonal to said open/close direction of the open/close hinge, and such open/close hinge is characterized in that the above mentioned comprises a pair of mounting members for mounting said open/close hinge on said main body in a manner to face each other leaving a space between them, and a bracket member attached between respective mounting plates of the respective mounting members via a first shaft member and a second shaft member in a manner to be pivotable in the open/close direction, that the above mentioned turning hinge comprises a third shaft member attached in a manner to be turnable in the direction orthogonal to the open/close direction with respect to said bracket member, and a supporting member attached to said lid body, which is fixed to the third shaft member, that a restriction means for restricting the open/close operation of said open/close hinge and turning operation of said turning hinge is provided between said open/close hinge and said turning hinge, that the above mentioned restriction means comprises a restriction pin slidably supported between either any one of said first shaft member or said second shaft member and said third shaft member, an elastic means for slidably biasing the restriction pin in one direction, a locking groove provided at the outer periphery of the third shaft member so as to insert one end of said restriction pin therein in compliance with a rotation angle of said third shaft member, and an engaging groove provided on either one side of said first shaft member or said second shaft member, which faces onto the other end of the restriction pin so as to insert the other end of said restriction pin therein in compliance with a rotation angle of said bracket member. As a result, the operation of said turning hinge is permissible only at a prescribed open angle of said open/close hinge, and the operation of said open/close hinge is permissible only at a prescribed turn angle of said turning hinge.

At that time this invention comprises a suction means to further enforce in the opening direction and/or in the closing direction when the open/close angle in the open/close direction of said bracket member comes to a prescribed angle is provided between said mounting members and said bracket member, wherein said suction means comprises the mounting plate of said bracket member pivotally attached to the shaft member, a first cam member including a first cam unit provided so as to rotate together with the mounting plate of the bracket member, a second cam member including a second cam unit on the opposite side to said first cam unit of the first cam member and disposed slidably in a manner that the rotation thereof is restricted by said shaft member, and an elastic means for pressing the second cam member toward the first cam member side.

Further, in the present invention, the locking groove disposed at the outer periphery of said third shaft member is provided in a pair at an interval of 180 degrees.

Still further, in the present invention, the locking groove dispose at the outer periphery of said third shaft member is formed in a manner that said inserted restriction pin cannot get out of except only in either one direction of right rotation or left rotation of said third shaft member.

In the present invention further, a rotation control means for controlling the third shaft member is provided between said third shaft member and said bracket member.

Moreover, in the present invention, the third shaft member and one or both of said first shaft member and/or said second shaft member are of a cylindrical shape.

Still further, in the present invention, an open/close control means for controlling open/close operation of the bracket member is provided between either of said mounting members and said bracket member.

Moreover, in the present invention, the above mentioned restriction pin is attached slidably with respect to said bracket member via a base member.

The present invention is further an electronic equipment using a hinge device connected with an open/close hinge for opening and closing a main body and a lid body in the open/close direction and a turning hinge for turning said main body and said lid body in the direction orthogonal to said open/close direction of the open/close hinge, and such hinge device is characterized in that the above mentioned comprises a pair of mounting members for mounting said open/close hinge on said main body in a manner to face each other leaving a space between them, and a bracket member attached between respective mounting plates of the respective mounting members via a first shaft member and a second shaft member in a manner to be pivotable in the open/close direction, that the above mentioned turning hinge comprises a third shaft member attached in a manner to be turnable in the direction orthogonal to the open/close direction with respect to said bracket member, and a supporting member attached to said lid body, which is fixed to the third shaft member, that a restriction means for restricting the open/close operation of said open/close hinge and turning operation of said turning hinge is provided between said open/close hinge and said turning hinge, that the above mentioned restriction means comprises a restriction pin slidably supported between either any one of said first shaft member or said second shaft member and said third shaft member, an elastic means for slidably biasing the restriction pin in one direction, a locking groove provided at the outer periphery of the third shaft member so as to insert one end of said restriction pin therein in compliance with a rotation angle of said third shaft member, and an engaging groove provided on either one side of said first shaft member or said second shaft member, which faces onto the other end of the restriction pin so as to insert the other end of said restriction pin therein in compliance with a rotation angle of said bracket member. As a result, the operation of said turning hinge is permissible only at a prescribed open angle of said open/close hinge, and the operation of said open/close hinge is permissible only at a prescribed turn angle of said turning hinge.

At that time in this invention the hinge device having a suction means to further enforce in the opening direction and/or in the closing direction when the open/close angle in the open/close direction of said bracket member comes to a prescribed angle is provided between said mounting members and said bracket member, the suction means comprises the mounting plate of said bracket member pivotally attached to the shaft member, a first cam member including a first cam unit provided so as to rotate together with the mounting plate of the bracket member, a second cam member including a second cam unit on the opposite side to said first cam unit of the first cam member and disposed slidably in a manner that the rotation thereof is restricted by said shaft member, and an elastic means for pressing the second cam member toward the first cam member side.

When the present invention is structured according to one aspect of the invention, respective members composing the hinge device can be provided largely in right and left without the need of being gathered to one position, allowing an easy assemble of the parts of the hinge device, as well as eliminating the need of entire replacement or decomposition of the parts at the time of a repair, so that the production and quality costs for the hinge device can be reduced.

When the present invention is structured according to another aspect of the invention, with the provision of the suction means to the hinge device, the lock mechanism exposed on the respective surfaces of the main body and lid body can be abolished, allowing to obtain an effect that the main body and lid body are prevented from damaging, and the lock mechanism is prevented from being broken when opening/closing the lid body.

When the present invention is structured according to a still further aspect of the invention, it is possible to obtain an effect that a rotation angle and a rotation direction of in a direction perpendicular to the open/close direction can be controlled even with a simple structure.

When the present invention is structured according to another aspect of the invention, it is possible to obtain an effect of passing a harness which electrically connects the main body and the lid body through either of a first shaft member and a second shaft member, and a third shaft member, preventing the harness from being exposed.

Further when the present invention is structured according to another aspect of the invention, the opening/closing operation of the lid body can be arrested freely.

Further when the present invention is structured according to another aspect of the invention, the sliding of the restriction pin can be made smoothly.

When the present invention is structured as in a further aspect of the invention, the hinge device altogether can be gathered to one position, enabling the manufacturing of the electronic equipment at a reasonable cost, further the hinge device is provided with suction means, and the lock means exposed outside and locking the main body while the main and lid body are opened is abolished, obtaining effects that the main and lid bodies can be prevented from being broken at the time of opening/closing operation of the main and lid bodies, and that the electronic equipment can be reduced in thickness even plural functions are added to the hinge device.

DETAILED DESCRIPTION OF THE PREFERRED EMBODIMENTS

Hereinafter, an embodiment of the present invention will be described in detail with reference to the drawings by citing a notebook personal computer as an example, however, as mentioned above, an electronic equipment according to the present invention is not limited thereto. The present invention is applicable, in addition to the above, to other small-sized electronic equipment such as a laptop personal computer, camera, camcorder, or a cellular phone, in which a lid body is structured in an openable/closable manner with respect to a main body via a hinge device and further to be turnable in the direction orthogonal to an opening/closing direction.

Figure 1:
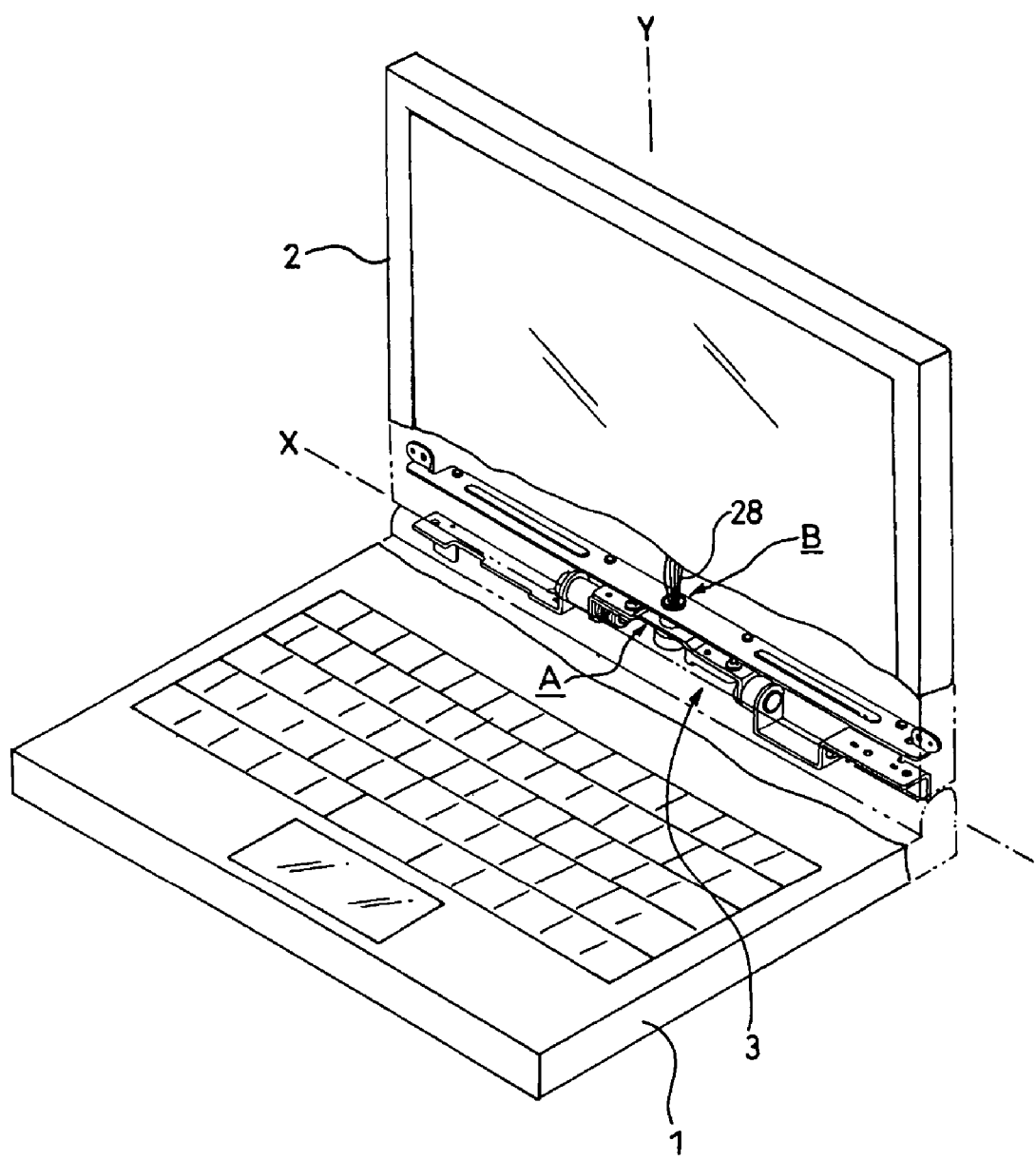
FIG. 1 is an explanatory view illustrating, as a kind of electronic equipment embodying the present invention, a notebook personal computer which is in the state of incorporating a hinge device.
Figure 2:
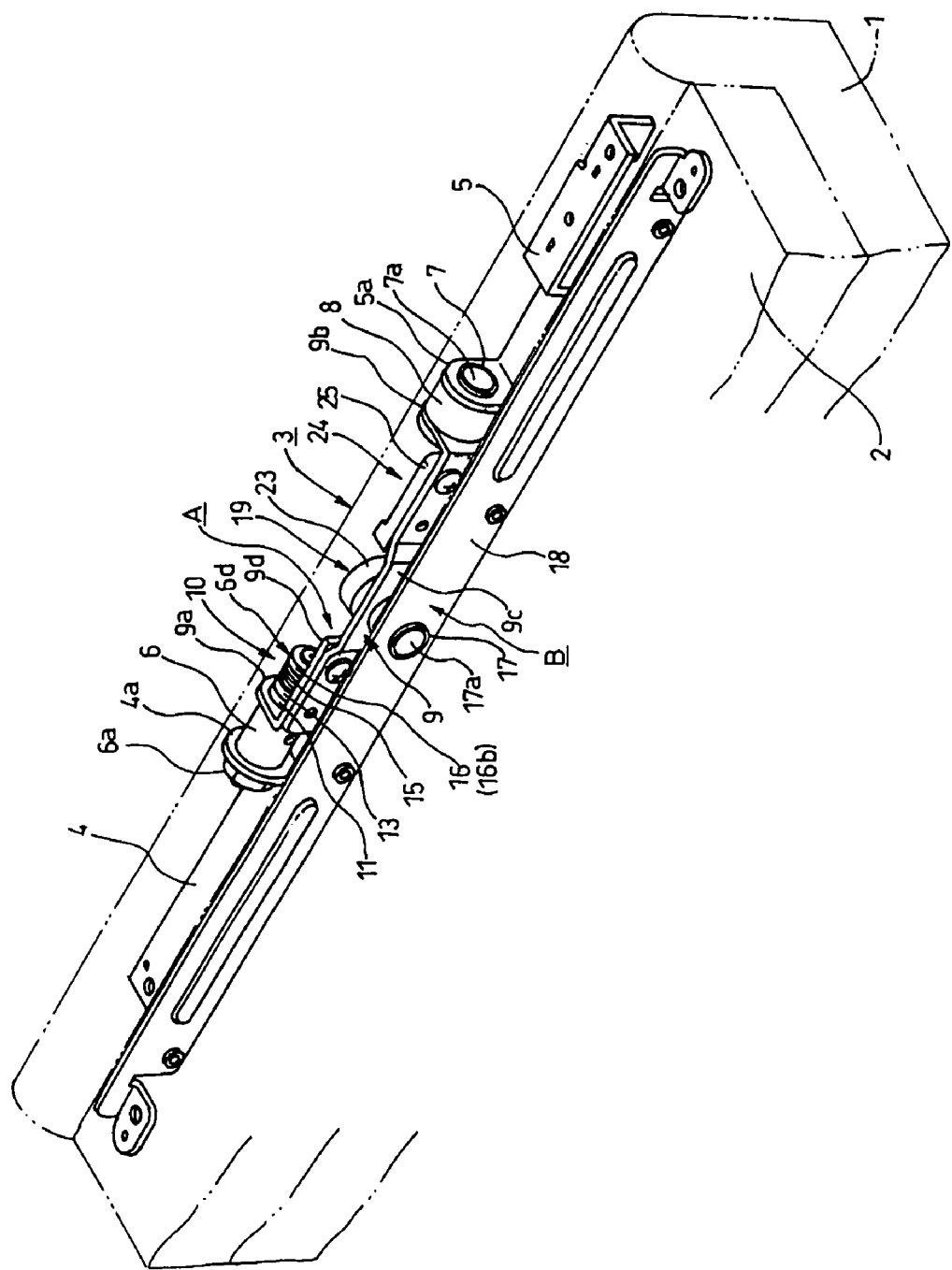
FIG. 2 is an explanatory view illustrating the state of the hinge device when a lid body is closed at an angle of 0 (zero) degrees with respect to a main body of the notebook personal computer shown in FIG. 1.
Figure 3:
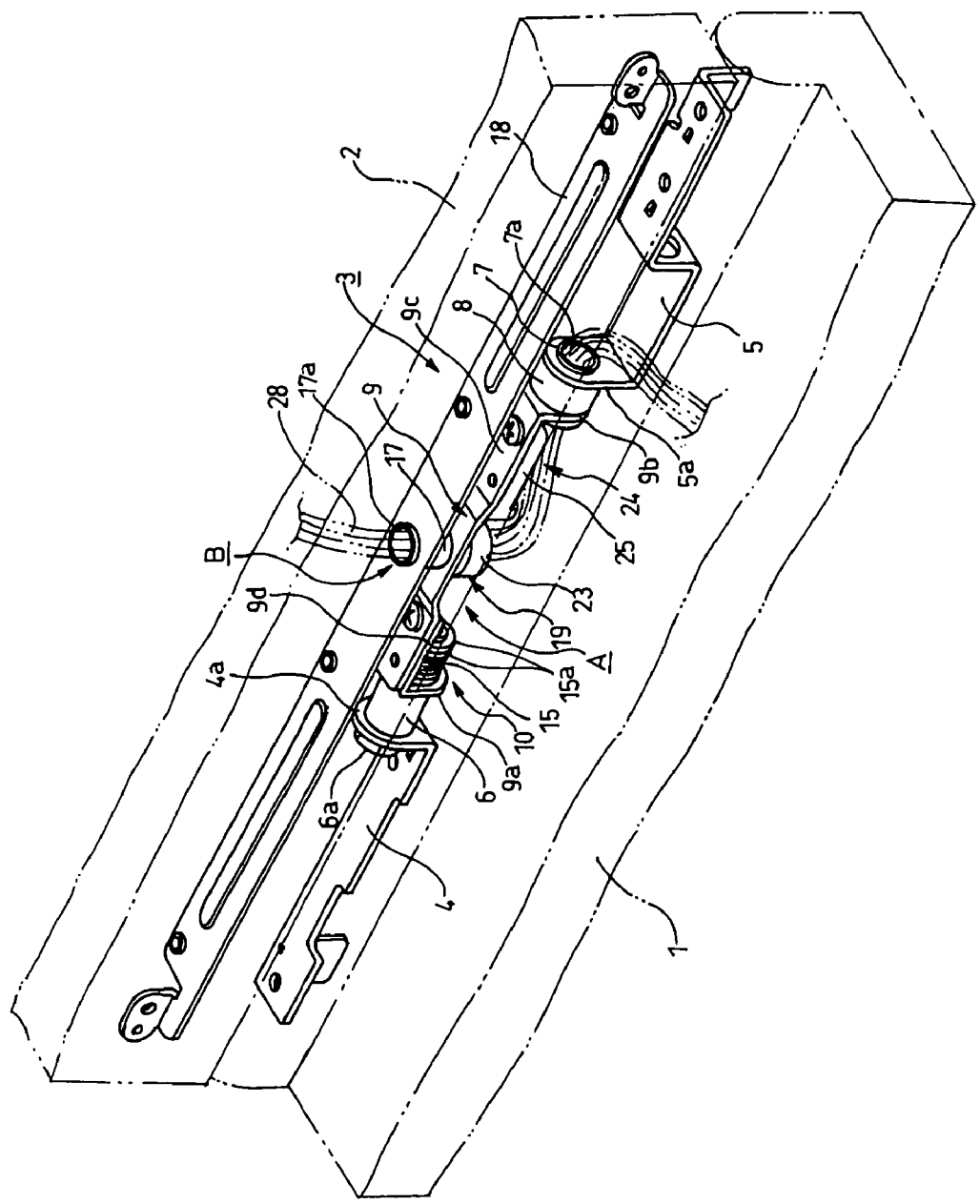
FIG. 3 is an explanatory view illustrating the state of the hinge device opened at an angle of 90 degrees with respect to the main body.
Figure 4:
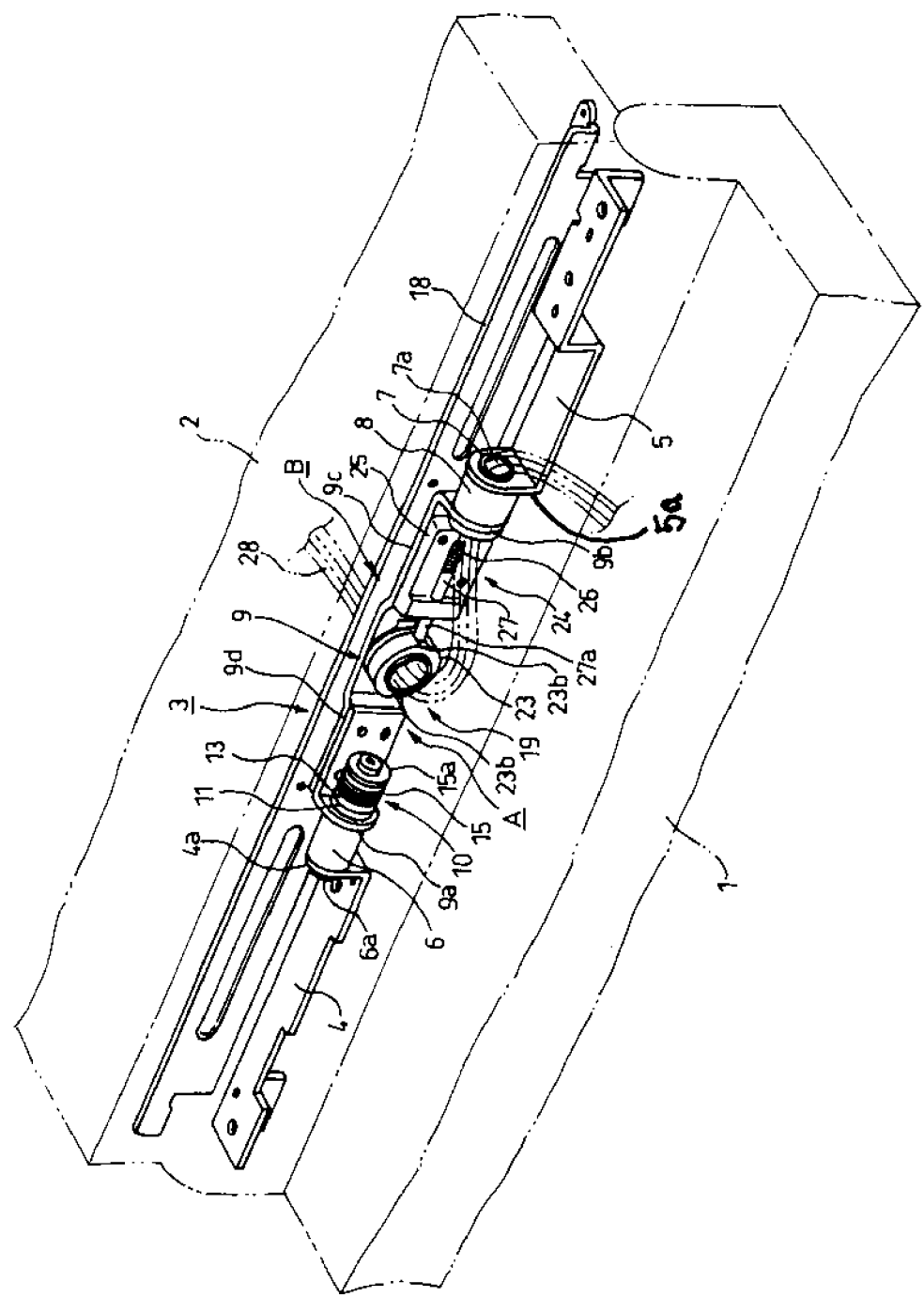
FIG. 4 is an explanatory view illustrating the state of the hinge device opened at an angle of 180 degrees with respect to the main body.
Figure 5:
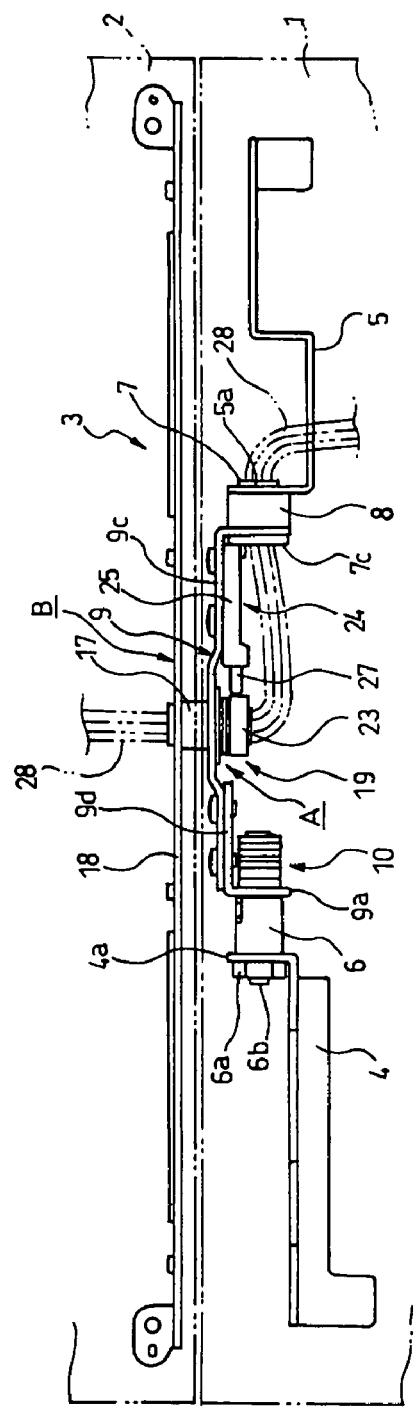
FIG. 5 is an explanatory view illustrating the hinge in the state shown in FIG. 3 from a front direction.
Figure 6:
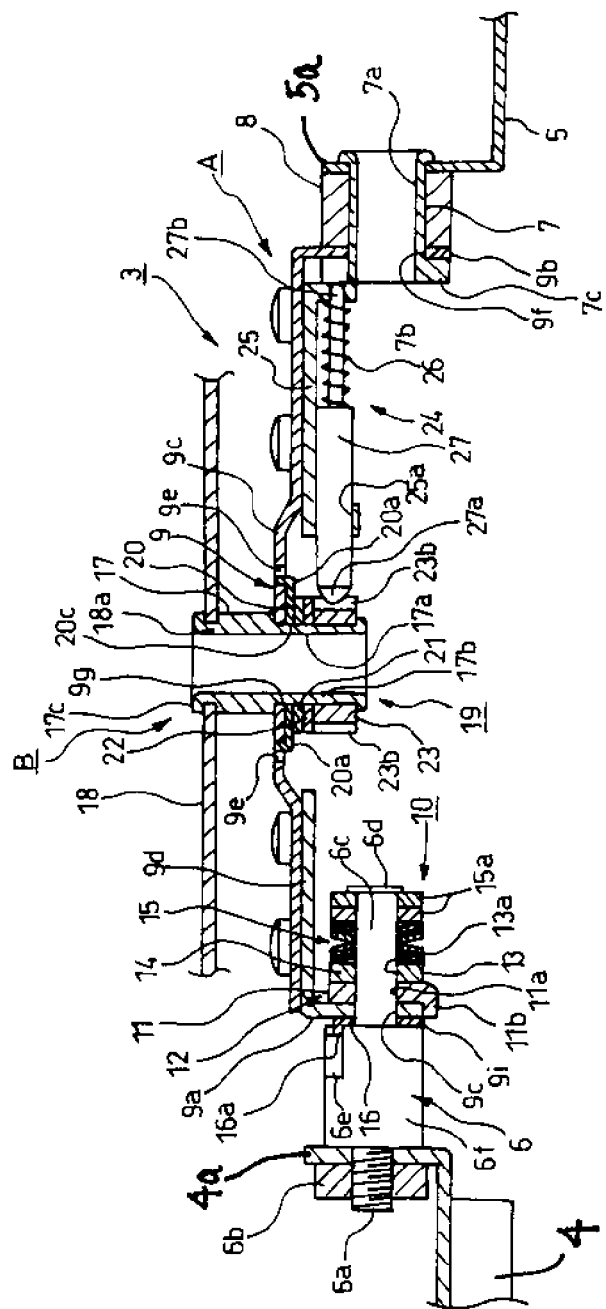
FIG. 6 is an explanatory view showing a substantial part of the hinge device in the state shown in FIG. 5.
Figure 7:
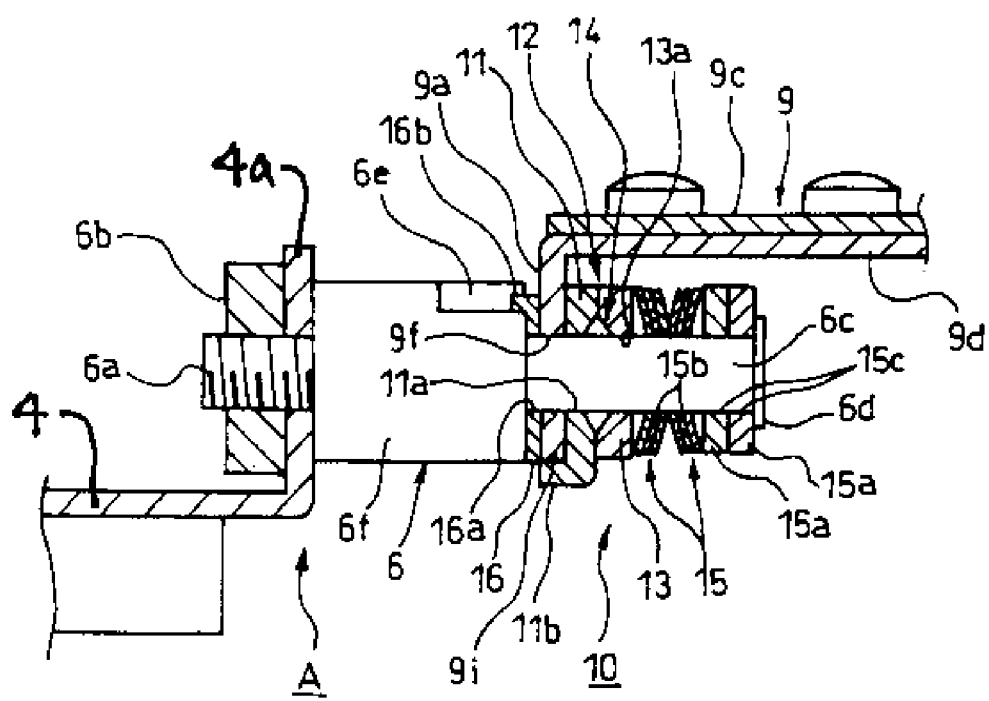
FIG. 7 is an enlarged sectional view of a rotation control means.
Figure 8:
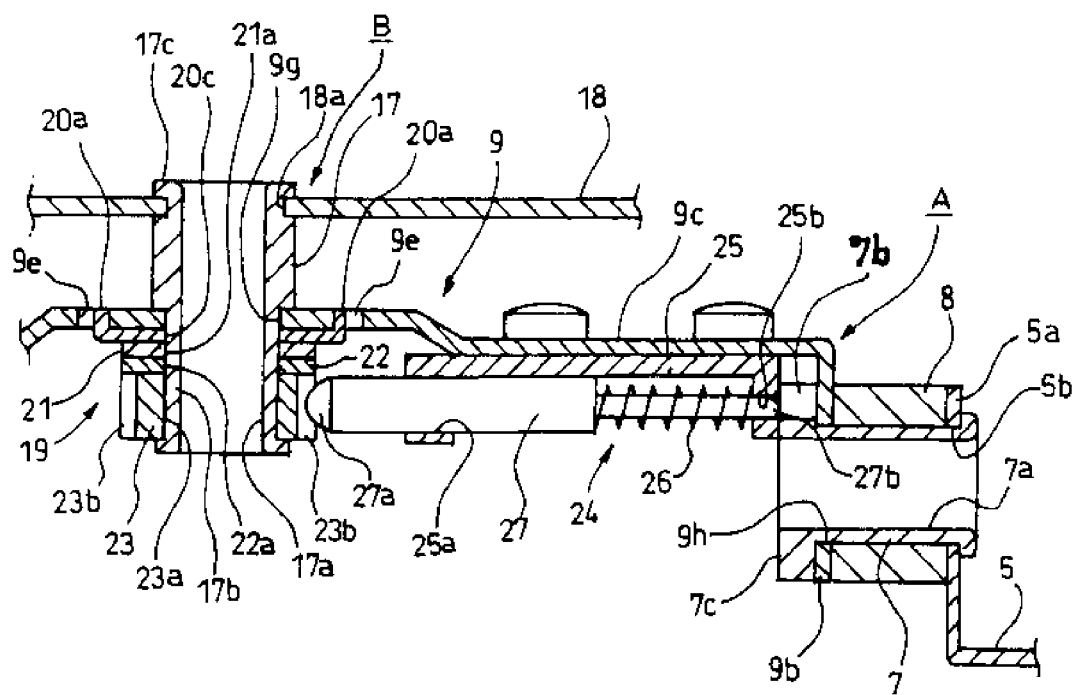
FIG. 8 is an enlarged sectional view of an open/close control means.

In the drawings, FIG. 1 shows a notebook personal computer as an example of the electronic equipment according to the present invention; and FIGS. 2 to 4 show respective example states of a hinge device coupling a main body and a lid body in a turnable manner as well as in an openable/closable manner with each other, in which the lid body is closed at an angle of 0 (zero) degrees with respect to the main body, the lid body is opened at an angle of 90 degrees from 0 (zero) degrees with respect to the main body, and the lid body is opened at an angle of 180 degrees from 90 degrees with respect to the main body, respectively. FIG. 5 is a front view showing the state of the hinge device in FIG. 3. FIG. 6 is an enlarged sectional view showing a substantial part of the hinge device in the state shown in FIG. 5. Further, FIG. 7 is an enlarged sectional view showing a part of a rotation control means, and FIG. 8 is an enlarged sectional view showing respective parts of an open/close control means and a restriction means. FIGS. 9 to 12 are views showing respective parts of the hinge device.

In FIGS. 1 and 2, that denoted by a symbolic numeral "1" is a main body installing therein, for example, a key board section, a control circuit board, and/or the like of the notebook personal computer, and that denoted by a symbolic numeral "2" is a lid body of a liquid crystal display device, a plasma display device, or the like, the lid body being coupled with the main body 1 via a hinge device 3 in an openable/closable manner as well as in a turnable manner in the direction orthogonal to such an opening/closing direction.

Subsequently, FIGS. 2 to 8 show a structure of the hinge device 3. In the drawings, those denoted by symbolic numerals "4" and "5" are first and second mounting members provided at an end portion of the main body 1 to face with each other at a prescribed interval, and mounting plate portions 4a, 5a are provided at mutually facing respective end portions of the first mounting member 4 and second mounting member 5. Note that the first mounting member 4 and second mounting member 5 have different shapes and structures from each other, whereas the shape and structure are not limited thereto. Various shapes and structures can be conceived depending on the types of the electronic equipment. In this embodiment, the mounting member 4 and mounting member 5 are independently provided, however, they can be provided as a single mounting member having the mounting plate portions at both the end portions thereof depending on the types of the electronic equipment.

Figure 9:
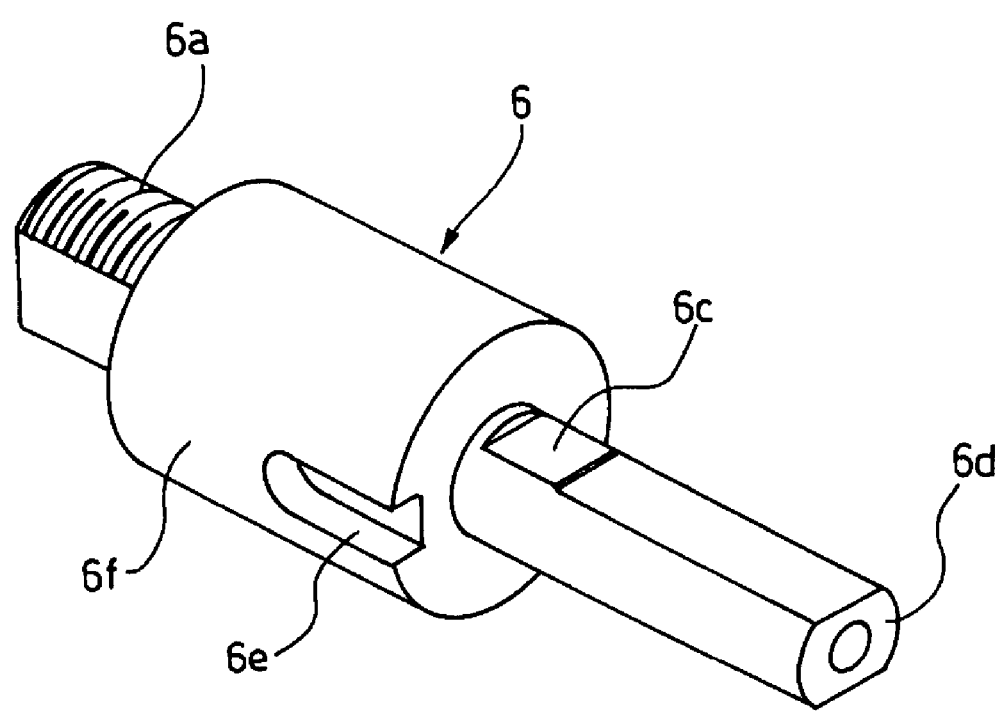
FIG. 9 is a perspective view of a first shaft member.
Figure 10:
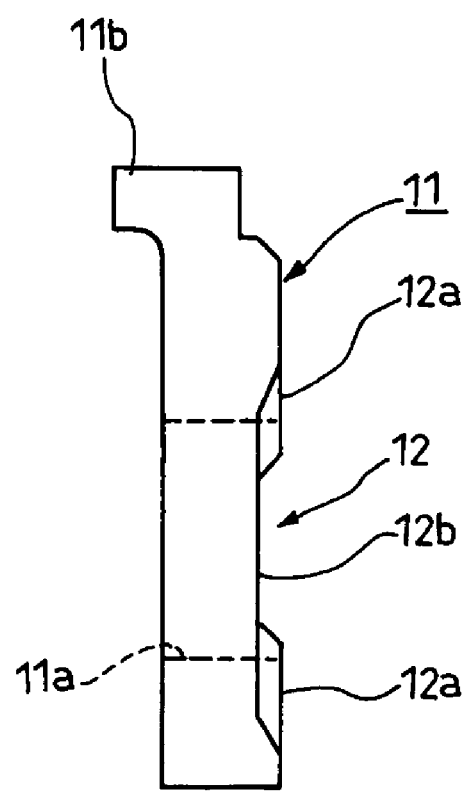
FIG. 10 is a front view of a first cam member of the rotation control means.
Figure 11:
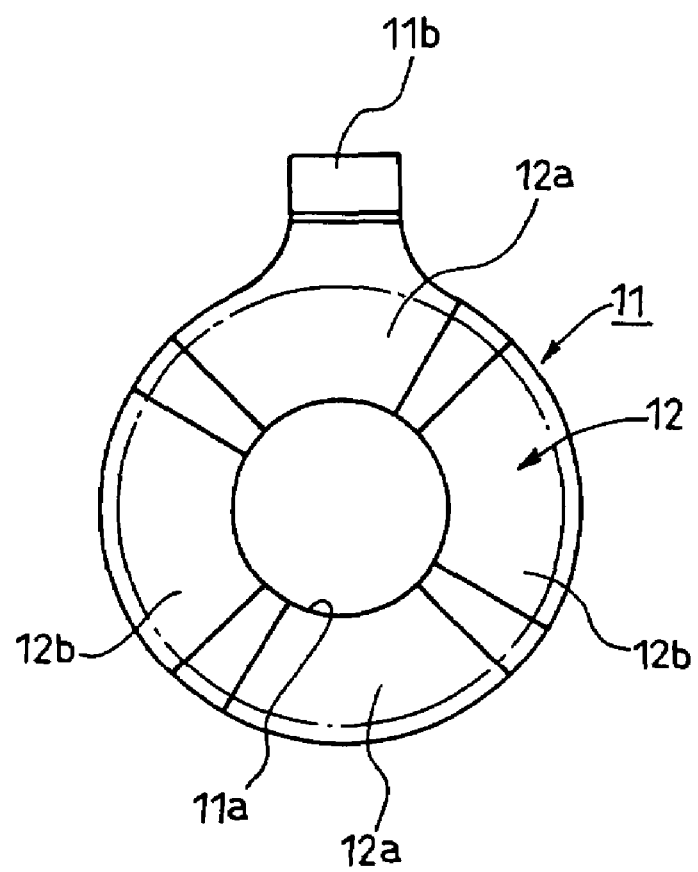
FIG. 11 is a side view of the first cam member of the rotation control means.
Figure 12:
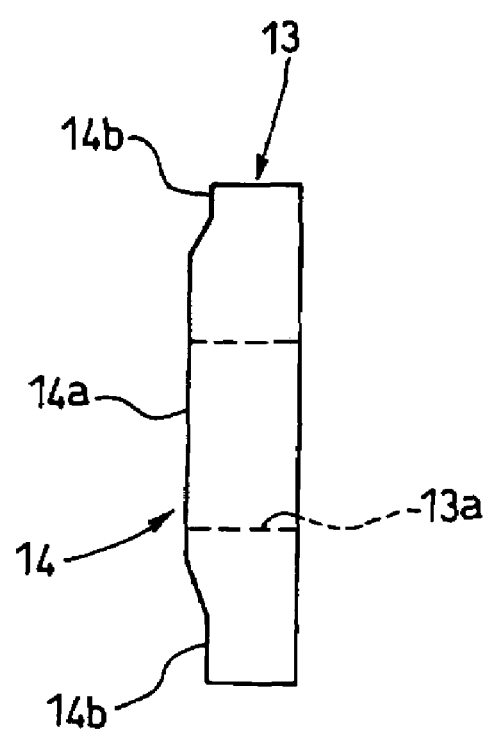
FIG. 12 is a front view of a second cam member of the rotation control means.
Figure 14:
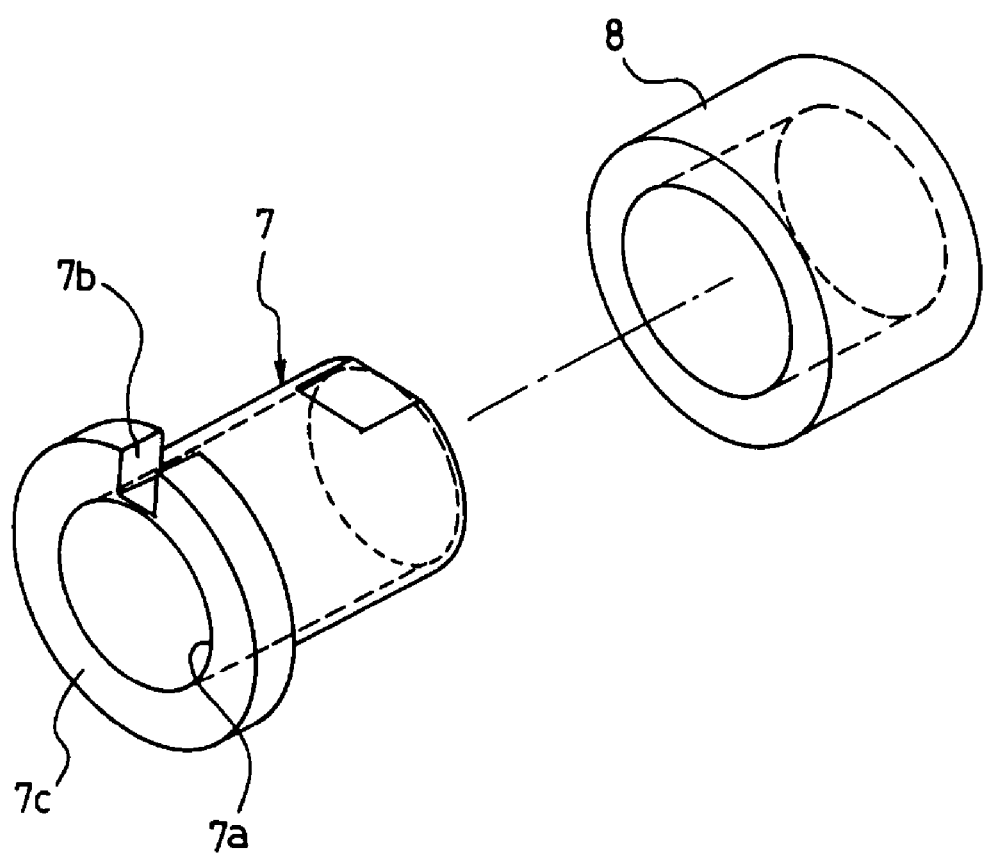
FIG. 14 is a perspective view of a second shaft member and a spacer.
Figure 15:
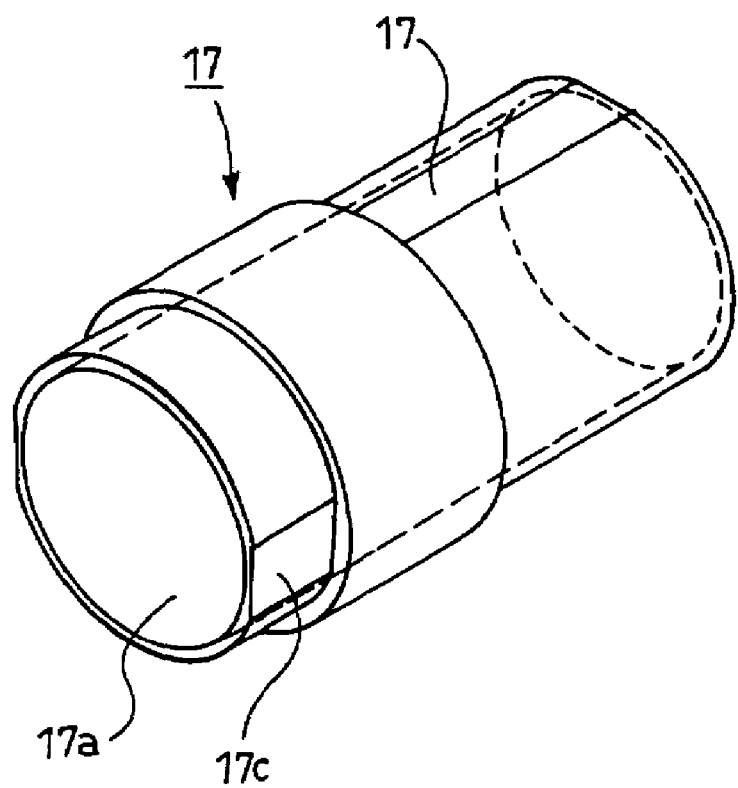
FIG. 15 is a perspective view of a third shaft member.
Figure 16:
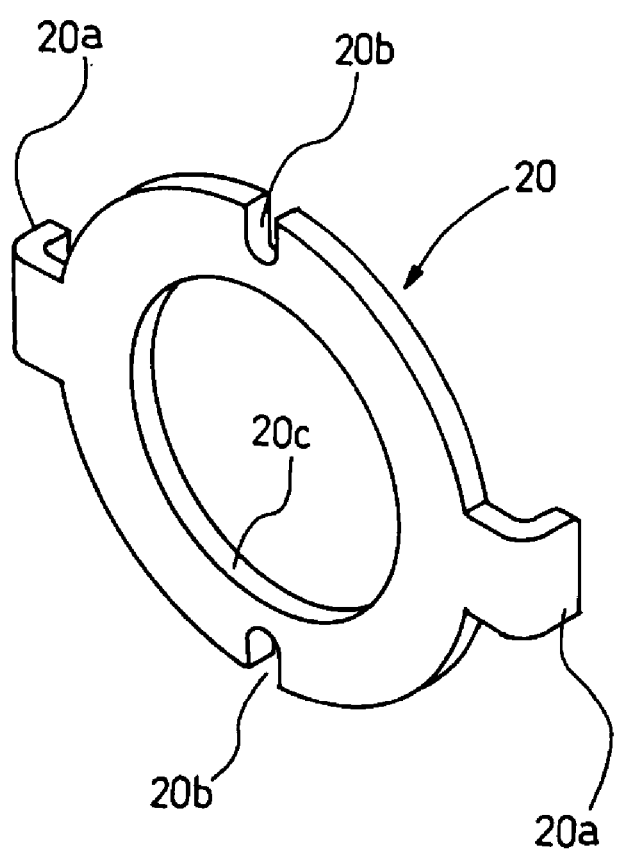
FIG. 16 is a perspective view of a first click plate of an open/close control means.

A pair of first shaft member 6 and second shaft member 7 is fixed horizontally to the mounting plate portion 4a and mounting plate portion 5a of the first mounting member 4 and the second mounting member 5 respectively by having a common axial center. Of the two, the first shaft member 6, which is plane as specifically shown in FIGS. 7 and 9, is fixed to the mounting plate portion 4a via a stuffing nut 6b fixed to a male screw part 6a formed at one end portion thereof with its turn being restricted by the mounting plate part 4a. As specifically shown in FIGS. 6, 8, 14, the second shaft member 7 having a cylindrical shape and having a through hole 7a in the axial direction is fixed by a caulking to the mounting plate portion 5a with its turn being restricted by the mounting plate part 5a, after a deformed shaft portion 7d thereof is inserted into and engaged with a deformed mounting hole 5b provided in the mounting plate portion 5a. Note that, the one denoted by a symbolic numeral "8" specifically shown in FIGS. 6, 8, and 14 is a spacer of a cylindrical shape.

As specifically shown in FIGS. 6 to 8, the first shaft member 6 and second shaft member and a bracket member 9, which is axially supported by the first and second shaft members 6, 7 by inserting them into its mounting holes 9f, 9h of mounting plate parts 9a, 9b provided at both the end portions thereof, are mounted in a turnable manner in the open/close direction, namely in the opening/closing direction of the lid body 2 with respect to the main body 1. Thus, the first shaft member 6 and second shaft member 7 and the bracket member 9, of which mounting plate portions 9a, 9b are coupled with the first shaft member 6 and second shaft member 7 in a turnable manner, compose an opening/closing hinge A in the open/close direction. Note that, in the embodiment, the drawings show the mounting plate portions 9a, 9b of the bracket member 9 that are mounted in a turnable manner with respect to the first shaft member 6 and second shaft member 7, however, they may be alternatively structured such that one or both of the mounting plate portions 9a, 9b is/are fixed to the first shaft member 6 and/or second shaft member 7 and one or both of the first shaft member 6 and/or second shaft member 7 is/are made turnable with respect to the first mounting member 4 and/or second mounting member 5.

It should be further noted that the bracket member 9 is composed of two pieces of plates here, namely an under plate 9c and a cam plate 9d having the mounting plate portions 9a, 9b respectively, however, the bracket member 9 is not limited thereto. The bracket member 9 may be composed of a single bracket member.

As specifically shown in FIGS. 6 to 8 and 14, a rotation control means 10 is provided between the first shaft member 6 and the mounting plate portion 9a of the bracket member 9, and a locking groove 7b is provided at an outer periphery of the end portion of the second shaft member 7.

Figure 13:
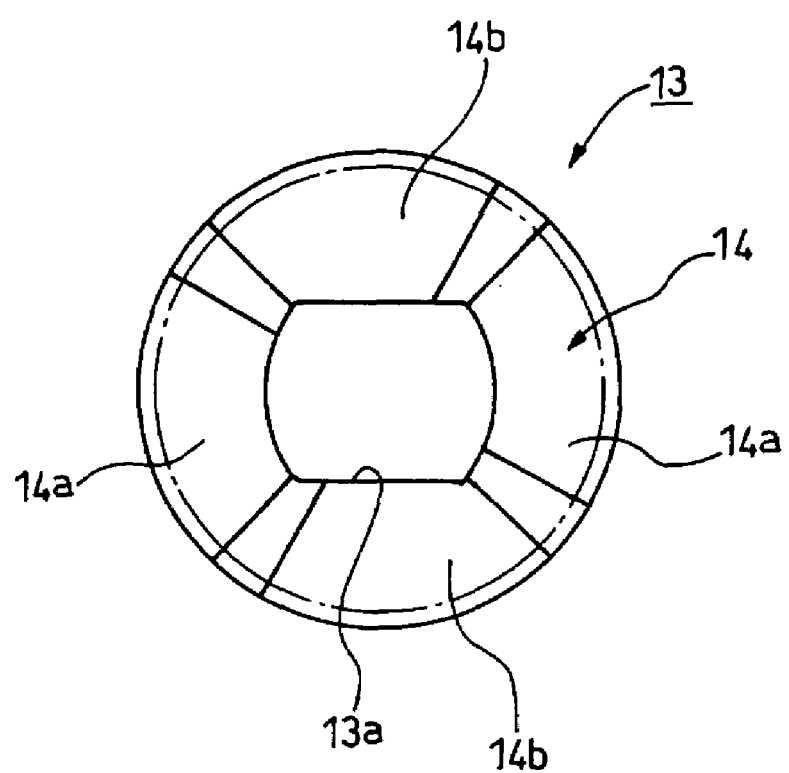
FIG. 13 is side view of the second cam member of the rotation control means.

The rotation control means 10 according to the embodiment shown in the drawings having a through hole 11a at the center thereof in the axial direction is composed of: as specifically shown in FIGS. 6, 7, 10, 11, a first cam member 11 provided by being restricted to turn by the mounting plate portion 9a by inserting a deformed small-diameter portion 6c of the first shaft member 6 into the through hole 11a in a turnable manner and by locking a locking portion 11b protruding from the edge portion thereof to a locking groove 9i provided at the mounting plate portion 9a of the bracket member 9; as specifically shown in FIGS. 6, 8, 9, a second cam member 13 having a deformed through hole 13a at the center thereof in the axial direction and being restricted to turn by the first shaft member 6 by inserting the deformed small-diameter portion 6c of the first shaft member 6 into the deformed through hole 13a to engage therewith; an elastic means 15 composed of a plurality of conical springs mounted to the deformed small-diameter portion 6c to press the second cam member 13 to the first cam member 11 side; pressure washers 15a, 15a; a caulking end 6d; and, as specifically shown in FIGS. 6, 7, a friction washer 16 sandwiched between a large-diameter portion 6f of the first shaft member 6 and the mounting plate portion 9a of the bracket member 9 with its locking piece 16a protruding from the edge portion thereof being locked at a locking recession 6e provided in the first shaft member 6, the friction washer 16 inserting the deformed small-diameter portion 6c into a through hole 16b provided at the center thereof in the axial direction. As specifically shown in FIGS. 7, 10, 13, on the respective pressing and facing surfaces of the first cam member 11 and second cam member 13, there are provided a first cam portion 12 composed of protrusions 12a, 12a and recessions 12b, 12b respectively provided at intervals of an angle of 180 degrees, and a second cam portion 14 composed of protrusions 14a, 14a and recessions 14b, 14b respectively provided at intervals of an angle of 180 degrees.

The first rotation control means 10 include a suction means at the same time. The suction means 10 to further enforce in the opening direction and/or in the closing direction when the open/close angle in the open/close direction of the bracket member 9 comes to a prescribed angle is provided between the first mounting member 4 and the bracket member 9. The suction means 10 comprises, the mounting plate portion 9a of the bracket member 9 pivotally attached to the first shaft member 6, a first cam member 11 including a first cam unit 12 provided so as to rotate together with the first mounting plate 9a of the bracket member 9, a second cam member 13 including a second cam unit 14 on the opposite side to the first cam unit 12 of the first cam member 11 and disposed slidably in a manner that the rotation thereof is restricted by the first shaft member 6, and an elastic means 15 for pressing the second cam member 13 toward the first cam member 11 side. It should be noted that the structure of the rotation control means 10 is not limited to that shown in the drawings. For instance, the first cam member 11 and second cam member 13 serve as a suction function automatically closing the lid body 2 at a prescribed angle or blow, and a locking function locking the lid body 2 in the closed state, however, only a friction mechanism simply generating a friction torque is acceptable by omitting the functions. Further, the friction mechanism is not limited to that of the embodiment shown in the drawings. Those known with various structure may be employed instead.

As specifically shown in FIG. 6, a third shaft member 17 is mounted in the direction orthogonal to the horizontal first shaft member 6 and second shaft member 7. in a turnable manner by inserting a deformed small-diameter portion 17b thereof into a mounting hole 9g provided at the center of the bracket member 9. The third shaft member 17 is of a cylindrical shape having a through hole 17a at the center thereof in the axial direction and fixedly has a substantially center portion of a supporting member 18 supporting the lid body 2 at a free end side thereof. This fixing means is structured such that a deformed mounting part 17c of the third shaft member 17 is inserted into a deformed mounting hole 18a of the supporting member 18 and an exposed end portion thereof is caulked as shown in the drawings, however, the means is not limited thereto, and a screwing may be accepted. Thus, rotating hinge B for rotating in A direction perpendicular to the open/close direction is composed of the third shaft member 17 mounted in a horizontally turnable manner to the bracket member 9 of the opening/closing hinge A in the open/close direction, and the supporting member 18 fixed to the third shaft member 17. Note that, as the other embodiment, it is possible to fix the third shaft member 17 to the bracket member 9 to mount the supporting member 18 to the thus-fixed third shaft member 17 in a horizontally turnable manner. In that case, the restriction means to restrict the turn of the supporting member 18 is provided between the bracket member 9 and the supporting member 18 or a member turning together with the supporting member 18.

Figure 17:
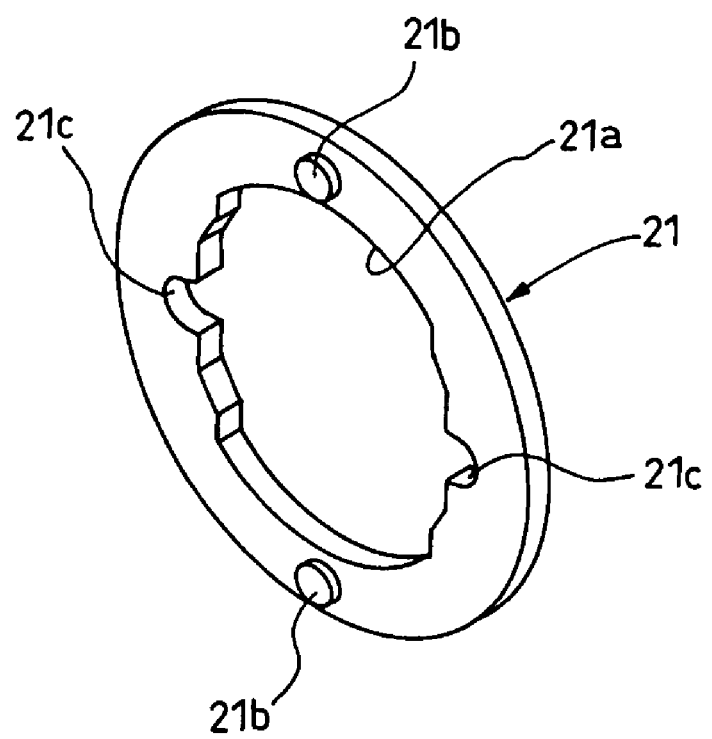
FIG. 17 is a perspective view of a second click plate of the open/close control means.
Figure 18:
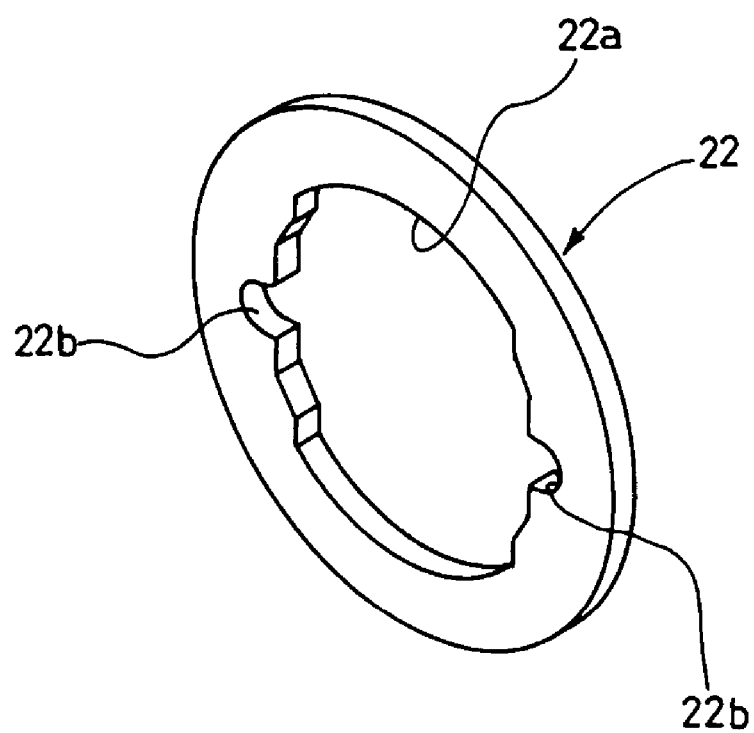
FIG. 18 is a perspective view of a leaf spring of the open/close control means.
Figure 19:
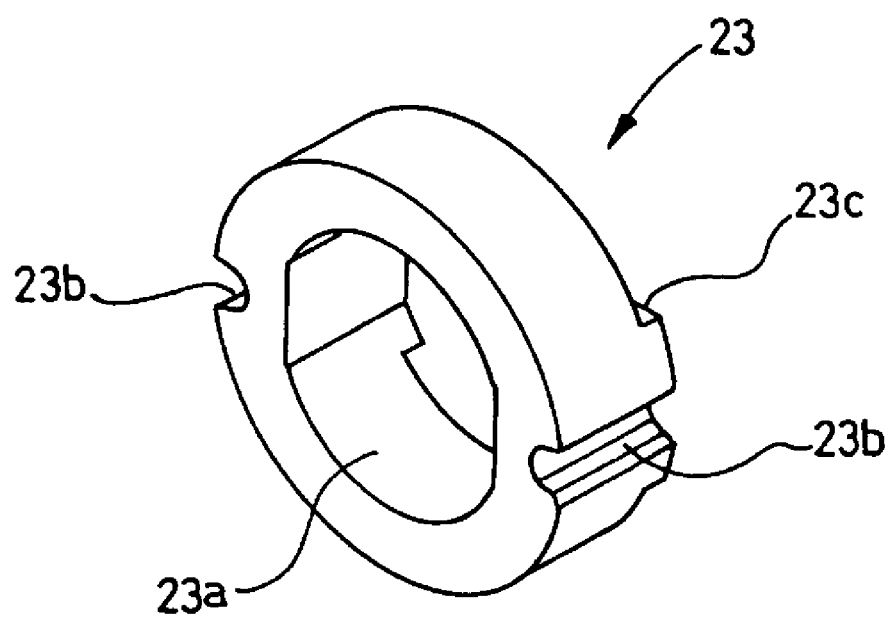
FIG. 19 is a perspective view of a strip member of the open/close control means.
Figure 20:
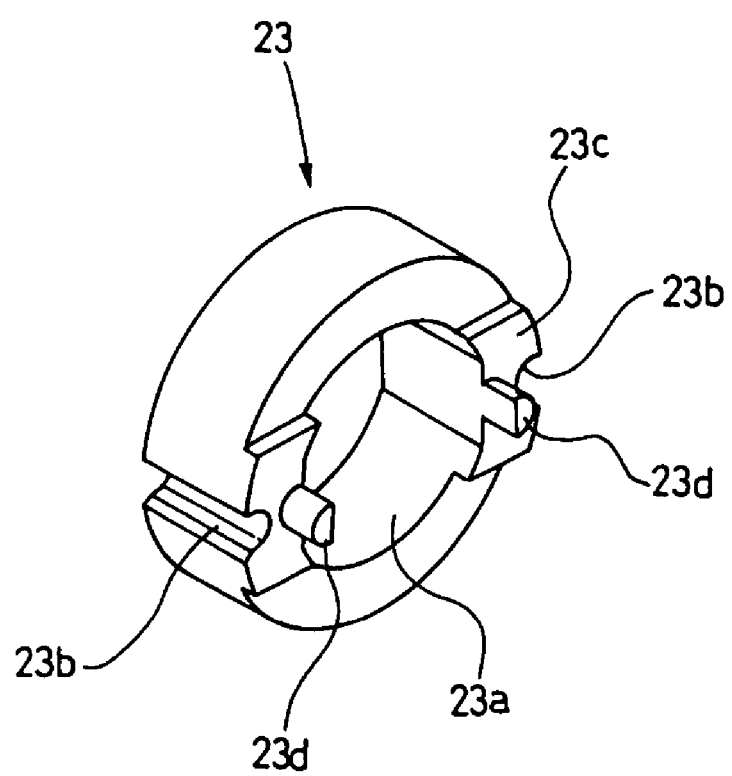
FIG. 20 is a perspective view of the strip member of the open/close control means viewing from the other direction.
Figure 21:
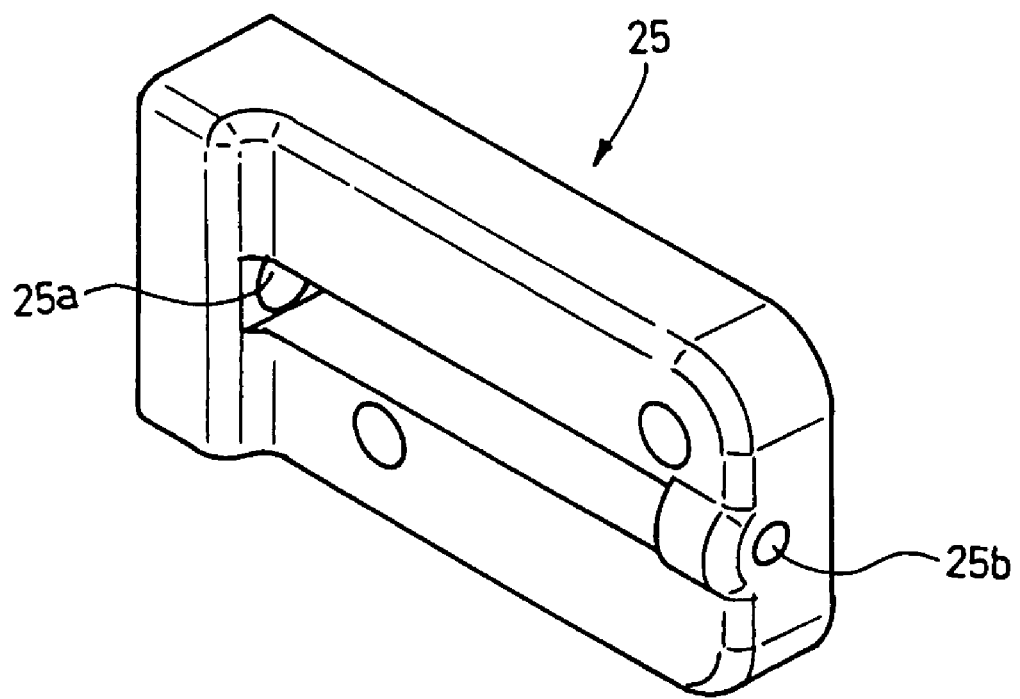
FIG. 21 is a perspective view of a base member of a restriction means.

Subsequently, there is provided an open/close control means 19 between the third shaft member 17 and the bracket member 9. The open/close control means 19, which has locking pieces 20a, 20a protruding from the edge portion thereof at intervals of an angle of 180 degrees, and click recession 20b, 20b provided at the edge portion thereof by shifting by an angle of 90 degrees from the locking pieces 20a, 20a, is composed of: a first click plate 20 inserting the deformed small-diameter portion 17b of the third shaft member 17 into a through hole 20c provided at the center thereof in the axial direction while locking the locking pieces 20a, 20a thereof to locking holes 9e, 9e provided in the bracket member 9; as specifically shown in FIGS. 6, 8, 17, a second click plate 21 inserting the deformed small-diameter portion 17b of the third shaft member 17 into a deformed through hole 21a thereof provided at the center thereof in the axial direction to be restricted to turn by the third shaft member 17 and having click protrusions 21b, 21b protruding toward the first click plate 20 side which are provided on the surface thereof at intervals of an angle of 180 degrees; as specifically shown in FIGS. 6, 8, 18, a leaf spring 22 abutting on the second click plate 21 and inserting the deformed small-diameter portion 17b of the third shaft member 17 into a deformed through hole 22a provided at the center thereof in the axial direction to engage therewith; and further, as shown in Figs, 6, 19, 20, a stop member 23 having engaging groove 23b, 23b at the outer periphery thereof at intervals of an angle of 180 degrees, abutting on the leaf spring 22, and inserting the deformed small-diameter portion 17b of the third shaft member 17 into a deformed through hole 23a provided at the center thereof in the axial direction to engage therewith to be fixed by caulking the end portion of the third shaft member 17. Note that the stop member 23 may be formed integrally with the third shaft member 17. As specifically shown in FIGS. 8, 20, a protruding portion 23c and protrusions 23d, 23d protruding one surface of the stop member 23 are engaged with recession 21c, 21c and 22b, 22b provided in the deformed through hole 21a of the second click plate 21 and the deformed through hole 22a of the leaf spring 22, respectively.

It should be noted that, as the open/close control means 19, that with a click stop function composed of the first click plate 20 and the second click plate 21 is shown in the drawings, however, the structure is not limited thereto. This may be instead the one simply carrying a normal friction function, and the stopper means restricting the turn angle of the lid body 2 may be provided differently.

As specifically shown in FIGS. 2 and 6, a restriction means 24 restricting the turn of the third shaft member 17 is provided between the second shaft member 7 and the third shaft member 17. The restriction means 24 is composed of a base member 25 mounted to the bracket member 9 and a restriction pin 27 fitted to guide holes 25a, 25b provided in the base member 25 while slidably biased to one direction by an elastic means 26 composed of a coil spring, and as specifically shown in FIG. 8, it is structured such that an end portion 27a of the restriction pin 27 fits into and detaches from one of engagement grooves 23b, 23b of the stop member 23 fixed to the third shaft member 17 depending on the turn angle of the third shaft member 17, and the other end portion 27b fits into and detaches from the locking groove 7b provided on the shaft end portion side of the second shaft member 7 depending on the turn angle of the second shaft member 7. Note that the locking groove 7b may be provided inside of the second shaft member 7 when the second shaft member 7 is of a cylindrical shape.

Subsequently, a description will be given of operations. First, as shown in FIG. 1, when the main body 1 and the lid body 2 are coupled via the hinge device 3, as specifically shown in FIGS. 3 to 5, it is possible to pass a harness 28, which electrically connects the main body 1 and the lid body 2, through inside a through hole 7a of the second shaft member 7 and the through hole 17a of the third shaft member 17, so that the harness 28 is not exposed outside. Therefore, in the state shown in FIG. 2 where the lid body 2 is closed with respect to the main body 1, even though it is not shown in the drawings, the protrusions 12a, 12a and recessions 12b, 12b of the first cam portion 12 of the first cam member 11 of the rotation control means 10 of the hinge device 3 engage with the recessions 14b, 14b and protrusions 14a, 14a of the second cam portion 14 of the second cam member 13, respectively, so that the bracket member 9 is restricted to turn and the lid body 2 is locked in the closed state with respect to the main body 1. Further, in this state of an angle of 0 (zero) degrees, the click protrusions 21b, 21b of the second click plate 21 fit into the click recession 20b, 20b of the first click plate 20 of the open/close control means 19 and they are click stopped. In the same state of this angle of 0 (zero) degrees, the one end portion 27a of the restriction pin 27 of the restriction means 24 engages with the engagement groove 23b provided in the stop member 23 of the open/close control means 19 and at the same time the other end portion 27b abuts on an end surface 7c of the second shaft member 7 without fitting into the locking groove 7b of the second shaft member 7, so that a rightward slide in the drawing is restricted, and the one end portion 27a of the restriction pin 27 is still fitted into the engagement groove 23b provided in the stop member 23 by an elastic force by the elastic means 26. Thus, the third shaft member 17 and therefore the lid body 2 mounted to the bracket member 9 are restricted to turn.

Subsequently, when the lid body 2 is turned clockwise by holding the front side thereof by hand so as to open the lid body 2 in the open/close direction with respect to the main body 1, then the protrusions 12a, 12a and recessions 12b, 12b of the first cam portion 12 of the first cam member 11 fixed to the mounting plate portion 9a of the bracket member 9, which turns together with the lid body 2, disengage from the recessions 14b, 14b and the protrusions 14a, 14a of the second cam portion 14 of the second cam member 13 restricted by the first shaft member 6 without regard to the pressing force by the elastic means 15, so that the lid body 2 is unlocked to be opened.

After that, when the lid body 2 is further opened clockwise, the protrusion 12a of the first cam portion 12 of the first cam member 11 fixed to the mounting plate portion 9a of the bracket member 9, which turns together, turns by sliding while it is in the state of being pressed to contact the protrusion 14a of the second cam portion 14 of the second cam member 13 fixed to the first shaft member 6, and as a result, a friction torque is generated between both the protrusions 12a, 12a, 14a, 14a, so that the lid body 2 is opened with respect to the main body 1 in a freely stoppable manner. Specifically, the lid body 2 is opened with respect to the main body 1 in the open/close direction around the x-axis, as shown in FIG. 2.

At this time, the other mounting plate portion 9b of the bracket member 9 turns together around the second shaft member 7 as a fulcrum, to which the bracket member 9 is pivotally fitted, however, the other end portion 27b of the restriction pin 27 of the restriction means 24 slides on the end surface 7c of the second shaft member 7 to restrict the restriction pin 27 to move in the right direction in the drawing, so that the bracket member 9, in other words, the lid body 2 in no case turns in the orthogonal direction to the opening/closing direction.

Subsequently, as shown in FIG. 3, when the lid body 2 is opened at an angle of 90 degrees with respect to the main body 1, the other end portion 27b of the restriction pin 27 of the restriction means 24 comes to a position to face the locking groove 7b of the second shaft member 7 as specifically shown in FIG. 8, and, therefore, the open/close operation is stopped at this point to add a force to turn the lid body 2 in the horizontal direction, then the end portion 27a of the restriction pin 27 of the restriction means 24 is enabled to escape rightward in the drawing from the engagement groove 23b of the stop member 23 mounted to the third shaft member 17 without regard to the elastic force by the elastic means 26, so that the lid body 2 is enabled to turn clockwise in the horizontal direction. At this time, the click protrusions 21b, 21b of the second click plate 21 separate from the click recession 20b, 20b of the first click plate 20 of the open/close control means 19. This separation is enabled by the second click plate 21 which moves to the protruding portion 23c side of the stop member 23 while pressing the leaf spring 22.

Thus, the first click plate 20 and the second click plate 21 are in the state of being pressed to contact with each other, so that the lid body 2 is allowed a friction turn clockwise in the horizontal direction, and when the lid body 2 turns at an angle of 180 degrees, again, the end portion 27a of the restriction pin 27 fits into the other engagement groove 23b provided in the stop member 23 by the elastic force of the elastic means 26, so that the lid body 2 is restricted to turn at an angle of over 180 degrees due to the shape of the engagement groove 23b. At the same time, the click protrusions 21b, 21b of the second click plate 21 fit into the click recession 20b, 20b of the first click plate 20 of the open/close control means 19 to be click stopped. Further, the horizontal turn of the lid body 2 at the angle of 0 (zero) degrees to the left side is restricted in relation to the end portion 27a of the restriction pin 27 and the shape of the engagement groove 23b of the stop member 23.

Specifically, in the electronic equipment according to the present embodiment, the horizontal turn of the lid body 2 with respect to the main body 1 is a reciprocating turn within the angle range from 0 (zero) degrees to 180 degrees and is not structured to turn in the direction of 360 degrees. This is enabled by shaping the engagement grooves 23b, 23b provided in the stop member 23 to have a slope at one side thereof respectively (in the present embodiment, one engagement groove 23b has a slope at an angle of approximately 30 degrees and the other engagement groove 23b has a slope at an angle of approximately 90 degrees), so that the end portion 27a of the restriction pin 27 is guided to escape from the sloped side with ease.

Accordingly, the lid body 2 turns horizontally in one direction from an angle of 0 (zero) degrees to 180 degrees and from 180 degrees to 0 (zero) degrees backward. In other words, the lid body 2 is not structured to turn in the direction from 180 degrees to 360 degrees and from 360 degrees to 180 degrees. However, the structure is not limited thereto. Further, when the lid body 2 is turned in the horizontal direction, the end portion 27b of the restriction pin 27 fits into the locking groove 7b of the second shaft member 7 to be locked, not allowing the lid body 2 to perform an opening/closing operation in the open/close direction.

As has been described in the above, as shown in FIG. 1, the lid body 2 is enabled to turn with respect to the main body 1 around a y-axis in the horizontal direction. And, only when the horizontal turn angle of the lid body 2 is 0 (zero) and 180 degrees, the lid body 2 is allowed the opening/closing operation in the open/close direction with respect to the main body 1, and when the opening angle of the lid body 2 in the open/close direction with respect to the main body 1 comes close to 180 degrees, the protrusion 12a of the first cam portion 12 of the first cam member 11 fixed to the mounting plate portion 9a of the bracket member 9 fits into the recession 14b of the second cam portion 14 of the second cam member 13 fixed to the first shaft member 6 to accelerate to open and then stop opening at an angle of 180 degrees. At the same time, as described above, when the opening angle in the open/close direction is at 90 degrees and more, there is generated the friction torque between the protrusions 12a and 14a which slide with each other while they are pressed to contact with each other, allowing the lid body 2 to stop freely with respect to the main body 1.

Just before the lid body 2 is closed, the protrusions 12a, 12a of the first cam portion 12 of the first cam member 11 of the rotation control means 10 fall into the recessions 14b, 14b of the second cam portion 14 of the second cam member 13, so that the lid body 2 is accelerated to be closed and locked in the closed state.

In the above-described embodiment, there are shown the first mounting member 4 and the second mounting member 5, which are mounted to the main body 1 side, and the supporting member 18, which is mounted to the lid body 2 side, however, the first mounting member 4 and the second mounting member 5 may be mounted to the lid body 2 side, and the supporting member 18 may be mounted to the main body 1 side.

Since the present invention has the above-described structure, the present invention is applicable to the previously-described various electronic equipment such as the notebook personal computer of which lid body opens/closes with respect to the main body and be turnable in the direction orthogonal to the opening/closing direction depending on the opened/closed angle.

What is claimed is:

1. A hinge device connected with an open/close hinge for opening and closing a main body and a lid body in an open/close direction and a turning hinge for turning said main body and said lid body in a direction orthogonal to said open/close direction of the open/close hinge:

wherein said open/close hinge comprises a pair of mounting members for mounting said open/close hinge on said main body in a manner to face each other leaving a space between them, and a bracket member attached between respective mounting plates of the respective mounting members via a first shaft member and a second shaft member in a manner to be pivotable in the open/close direction;

wherein said turning hinge comprises a third shaft member attached in a manner to be turnable in the direction orthogonal to the open/close direction with respect to said bracket member, and a supporting member attached to said lid body, which is fixed to the third shaft member;

wherein a restriction means for restricting the open/close operation of said open/close hinge and turning operation of said turning hinge is provided between said open/close hinge and said turning hinge; and wherein said restriction means comprises:

a restriction pin slidably supported between either any one of said first shaft member or said second shaft member and said third shaft member;

an elastic means for slidably biasing the restriction pin in one direction;

a locking groove provided at the outer periphery of the third shaft member so as to insert one end of said restriction pin therein in compliance with a rotation angle of said third shaft member; and an engaging groove provided on either one side of said first shaft member or said second shaft member, which faces onto the other end of the restriction pin so as to insert the other end of said restriction pin therein in compliance with a rotation angle of said bracket member so that the operation of said turning hinge is permissible only at a prescribed open angle of said open/close hinge, and the operation of said open/close hinge is permissible only at a prescribed turn angle of said turning hinge.

2. The hinge device according to claim 1, wherein a suction means to further enforce in the opening direction and/or in the closing direction when the open/close angle in the open/close direction of said bracket member comes to a prescribed angle, is provided between said mounting members and said bracket member, said suction means comprising:

the mounting plate of said bracket member pivotably attached to the shaft member;

a first cam member including a first cam unit provided so as to rotate together with the mounting plate of the bracket member;

a second cam member including a second cam unit on the opposite side to said first cam unit of the first cam member and disposed slidably in a manner that the rotation thereof is restricted by said shaft member; and an elastic means for pressing the second cam member toward the first cam member side.

3. The hinge device according to claim 1, wherein said locking groove disposed at the outer periphery of said third shaft member is provided in a pair at an interval of 180 degrees.

4. The hinge device according to claim 1, wherein said locking groove disposed at the outer periphery of said third shaft member is formed in a manner that said inserted restriction pin cannot get out of except only in either one direction of right rotation or left rotation of said third shaft member.

5. The hinge device according to claim 1, wherein a rotation control means for controlling the third shaft member is provided between said third shaft member and said bracket member.

6. The hinge device according to claim 1, wherein said third shaft member and one or both of said first shaft member and/or said second shaft member are of a cylindrical shape.

7. The hinge device according to claim 1, wherein an open/close control means for controlling open/close operation of the bracket member is provided between either of said mounting members and said bracket member.

8. The hinge device according to claim 1, wherein said restriction pin is attached slidably with respect to said bracket member via a base member.

9. Electronic equipment using a hinge device which links an open/close hinge for opening and closing a main body and a lid body in the open/close direction, and a turning hinge for turning said main body and said lid body in the direction orthogonal to said open/close direction of the open/close hinge, wherein said open/close hinge comprises a pair of mounting members to mount said open/close hinge on said main body in a manner to face each other leaving a space between them, and a bracket member attached between respective mounting plates of the respective mounting members via a first shaft member and a second shaft member in a manner to be pivotable in the open/close direction;

wherein said turning hinge comprises a third shaft member attached in a manner to be turnable in the direction orthogonal to the open/close direction with respect to said bracket member, and a supporting member attached to said lid body, which is fixed to the third shaft member;

wherein a restriction means for restricting the open/close operation of said open/close hinge and turning operation of said turning hinge is provided between said open/close hinge and said turning hinge;

wherein said restriction means comprises:

a restriction pin slidably supported between either of said first shaft member or said second shaft member and said third shaft member;

an elastic means for slidably biasing the restriction pin in one direction;

a locking groove provided at the outer periphery of the third shaft member so as to insert one end of said restriction pin therein in compliance with a rotation angle of said third shaft member; and an engaging groove provided on either one side of said first shaft member or said second shaft member, which faces onto the other end of the restriction pin so as to insert the other end of said restriction pin therein in compliance with a rotation angle of said bracket member, so that the operation of said turning hinge is permissible only at a prescribed opened angle of said open/close hinge, and the operation of said open/close hinge is permissible only at a prescribed turn angle of said turning hinge.

10. The electronic equipment according to claim 9, wherein a suction means to further enforce in the opening direction and/or in the closing direction when the open/close angle in the open/close direction of said bracket member comes to a prescribed angle is provided between said mounting members and said bracket member;

wherein said suction means comprises:

the mounting plate of said bracket member pivotably attached to the shaft member;

a first cam member including a first cam unit provided so as to rotate together with the mounting plate of the bracket member;

a second cam member including a second cam unit on the opposite side to said first cam unit of the first cam member and disposed slidably in a manner that the rotation thereof is restricted by said shaft member; and an elastic means for pressing the second cam member toward the first cam member side.

* * * * *